US012552309B2

(12) United States Patent
Lee et al.

(10) Patent No.: US 12,552,309 B2
(45) Date of Patent: Feb. 17, 2026

(54) AUTOMATIC LIGHT INTENSITY CONTROL DEVICE FOR VEHICLE REAR LAMPS IN RESPONSE TO CHANGES IN VISIBILITY DISTANCE AND ITS CONTROL METHOD

(71) Applicant: KOREA INSTITUTE OF CIVIL ENGINEERING AND BUILDING TECHNOLOGY, Goyang-si (KR)

(72) Inventors: Suk-Ki Lee, Gimpo-si (KR); Yongseok Kim, Goyang-si (KR); Won Il Park, Bucheon-si (KR); Ki-Soo Park, Paju-si (KR)

(73) Assignee: KOREA INSTITUTE OF CIVIL ENGINEERING AND BUILDING TECHNOLOGY, Goyang-si (KR)

( * ) Notice: Subject to any disclaimer, the term of this patent is extended or adjusted under 35 U.S.C. 154(b) by 59 days.

(21) Appl. No.: 18/494,362

(22) Filed: Oct. 25, 2023

(65) Prior Publication Data
US 2024/0308420 A1 Sep. 19, 2024

(30) Foreign Application Priority Data

Mar. 16, 2023 (KR) .......... 10-2023-0034782

(51) Int. Cl.
*B60Q 1/30* (2006.01)
*B60W 40/02* (2006.01)
*H05B 45/12* (2020.01)

(52) U.S. Cl.
CPC .......... *B60Q 1/3015* (2022.05); *B60W 40/02* (2013.01); *H05B 45/12* (2020.01); *B60Q 2300/054* (2013.01); *B60W 2420/403* (2013.01)

(58) Field of Classification Search
CPC .............. B60Q 1/3015; B60Q 1/303; B60Q 2300/054; B60W 40/02
See application file for complete search history.

(56) References Cited

U.S. PATENT DOCUMENTS 8,944,656 B1 2/2015 Chen
2009/0273941 A1* 11/2009 Englander .............. B60Q 1/324
362/494
(Continued)

FOREIGN PATENT DOCUMENTS

CN 105774639 A 7/2016
DE 42 06 142 A1 9/1993
(Continued)

OTHER PUBLICATIONS

The extended European search report issued by the European Patent Office on Feb. 8, 2024, which corresponds to European Patent Application No. 23205554.1-1012 and is related to U.S. Appl. No. 18/494,362.

(Continued)

*Primary Examiner* — Benyam Haile
(74) *Attorney, Agent, or Firm* — Studebaker Brackett PLLC

(57) ABSTRACT

The present invention relates to an automatic light intensity control device for vehicle rear lamps in response to changes in visibility distance and its control method. To this end, the automatic light intensity control device for vehicle rear lamps of the present invention comprises: a visibility distance measurement unit that is mounted on a driving vehicle or installed in the vicinity of a driving road to measure a visibility distance of the road in real time; and a light intensity calculation and control unit that is mounted on the driving vehicle to calculate an appropriate light intensity using visibility distance information measured by the visibility distance measurement unit and then control the light intensity of rear lamps in real time.

4 Claims, 14 Drawing Sheets

(56) References Cited

U.S. PATENT DOCUMENTS

| | | | | |
|---|---|---|---|---|
| 2016/0132745 A1* | 5/2016 | Falb | ............ | G06T 7/00 348/148 |
| 2019/0193626 A1* | 6/2019 | Park | ............ | B60W 40/105 |

FOREIGN PATENT DOCUMENTS

| | | | |
|---|---|---|---|
| DE | 10 2005 054 497 A1 | 5/2007 | |
| EP | 816168 A2 * | 1/1998 | ............ B60Q 1/52 |
| EP | 0 816 168 B1 | 7/2002 | |
| EP | 1 476 326 B1 | 4/2008 | |
| EP | 2 067 660 A2 | 6/2009 | |
| EP | 1 521 980 B1 | 6/2015 | |
| FR | 2 988 052 A1 | 9/2013 | |
| FR | 2988052 B1 * | 11/2014 | ........... B60Q 1/1423 |
| JP | H06-016084 A | 1/1994 | |
| JP | 2017-193277 A | 10/2017 | |
| KR | 10-1155870 B1 | 6/2012 | |
| KR | 10-1273448 B1 | 6/2013 | |
| KR | 10-2014-0030726 A | 3/2014 | |
| KR | 10-2014-0137896 A | 12/2014 | |
| KR | 10-2019-0081390 A | 7/2019 | |

OTHER PUBLICATIONS

An Office Action; "Notice of Reasons for Refusal," mailed by the Japanese Patent Office on Dec. 3, 2024, which corresponds to Japanese Patent Application No. 2023-184354 and is related to U.S. Appl. No. 18/494,362.

Communication pursuant to Article 94(3) EPC issued by the European Patent Office on May 15, 2025, which corresponds to European Patent Application No. 23205554.1-1009 and is related to U.S. Appl. No. 18/494,362.

* cited by examiner

AUTOMATIC LIGHT INTENSITY CONTROL DEVICE FOR VEHICLE REAR LAMPS IN RESPONSE TO CHANGES IN VISIBILITY DISTANCE AND ITS CONTROL METHOD

CROSS-REFERENCE TO RELATED PATENT APPLICATION

This application claims the benefit of Korean Patent Application No. 10-2023-0034782, filed on Mar. 16, 2023, in the Korean Intellectual Property Office, the disclosure of which is incorporated herein in its entirety by reference.

BACKGROUND OF THE INVENTION

1. Field of the Invention

The present invention relates to an automatic light intensity control device for vehicle rear lamps in response to changes in visibility distance and its control method, and more specifically, to an automatic light intensity control device for vehicle rear lamps in response to changes in visibility distance and its control method, which can automatically calculates an appropriate light intensity using visibility distance information measured in real time in the vicinity of a driving vehicle or driving road and then control the light intensity of rear lamps in real time based on the calculated light intensity.

2. Description of the Related Art

It is generally known that the incidence of traffic accidents increases in adverse weather conditions such as typhoons, localized heavy rainfall, or snowfall. However, according to the fatality rate of traffic accidents by weather conditions, days with rain or snowfall were found to have an increase of about 35% compared to clear days, while days with fog were found to have an incidence 5.6 times higher. This is attributed to the restriction of drivers' forward visibility caused by adverse weather conditions or fog. The collision of 29 vehicles on the West Sea Bridge in 2006 and the collision of 106 vehicles on the Yeongjong Bridge in 2015 were both attributed to reduced forward visibility caused by fog.

The road management authorities are aware of the dangers posed by fog on the roads and have been installing and operating safety facilities; however, their efforts have often been limited to simply informing about the occurrence of fog on Variable Message Signs (VMSs) and encouraging drivers to reduce their driving speed. As a result, multiple pile-up accidents caused by fog occur every year, with statistics from 2018 showing 29 fatalities and 462 injuries. Therefore, there is a pressing need for more effective and fundamental solutions.

Meanwhile, the tail lights and brake lights of rear combination lamps (hereinafter referred to as "rear lamps") applied to vehicles were all unable to adapt flexibly to varying visibility conditions caused by fog, as they were designed to have uniform light intensities. Therefore, as shown in FIG. 1, in cases where a sufficient visibility distance was not ensured, the following vehicle could perceive the brake lights only when the brake lights were turned on, and this led to situations where the following vehicle was unable to avoid a rear-end collision due to the braking distance, even if the following vehicle activated its own braking system belatedly.

The first reason why all conventional tail lights and brake lights had to have uniform light intensities was that there was no technical means in vehicles to measure the visibility distance, which constrains the forward visibility, or to receive data in real time. Moreover, there was a lack of experimental facilities that could provide a location or method for determining the appropriate light intensity, which is the second reason.

Prior art document for controlling the light intensity of tail lights includes Korea Patent No. 10-1273448, filed by the applicant (registered on Jun. 4, 2013, hereinafter referred to as the "prior art document"). The prior art document discloses receiving visibility distance data measured externally from the vehicle and adjusting the light intensity of the vehicle's tail lights to ensure the visibility for the following vehicle's driver.

However, according to the above-mentioned prior art document, the range of visibility is divided into stages to uniformly control the displayed luminance based on the visibility distance for each stage, thus failing to reflect the driver's degree of recognition based on the light intensity for each visibility distance. Moreover, it relies entirely on visibility distance data measured externally from the vehicle, which necessitates the installation of additional road facilities and the installation of light-emitting and light-receiving units on both the leading and following vehicles. This reliance leads to limitations in terms of data accuracy and universality.

Furthermore, the conventional control devices for vehicle tail lights primarily focused on controlling the light intensity based on the relative distance of the following vehicle. They often did not consider various variables such as the speed of the following vehicle, resulting in unnecessary increases in luminance, which were inefficient. This excessive light intensity could even hinder the visibility for the following vehicle's driver rather than enhancing it.

In particular, with the advancement of autonomous driving, the importance of the driver's forward vehicle recognition is expected to decrease in future vehicles. Therefore, it is deemed necessary to propose not only tail lights in the visible light spectrum for the driver's perception but also tail lights in the non-visible light range that can be detected by sensing devices of autonomous vehicles.

REFERENCES OF THE RELATED ART

Patent Document 1: Korean Patent No.: 10-1273448 (Registered on Jun. 4, 2013)
Patent Document 2: Korean Patent No.: 10-1155870 (Registered on Jun. 7, 2012)

SUMMARY OF THE INVENTION

The present invention has been made in an effort to solve the above-described problems associated with prior art, and an object of the present invention is to provide an automatic light intensity control device for vehicle rear lamps in response to changes in visibility distance and its control method, which continuously changes the light intensity of rear lamps based on a real-time visibility distance of a driving vehicle, which makes it possible to ensure a more stable visibility for the following vehicle's driver, to accurately and easily obtain real-time visibility distance information, to more effectively control the light intensity based further on the following vehicle's speed, and to emit wavelengths in the non-visible light range for autonomous vehicles to detect.

In order to achieve the above-described object, the present invention provides an automatic light intensity control device (A) for vehicle rear lamps in response to changes in visibility distance, comprising: a visibility distance measurement unit 10 that is mounted on a driving vehicle or installed in the vicinity of a driving road to measure a visibility distance of the road in real time; and a light intensity calculation and control unit 20 that is mounted on the driving vehicle to calculate an appropriate light intensity (Cd) using visibility distance information (Md) measured by the visibility distance measurement unit 10 and then control the light intensity of rear lamps RL in real time.

The light intensity calculation and control unit 20 may determine the appropriate light intensity (Cd) using the real-time visibility distance information (Md) based on accumulated data obtained by measuring the light intensity of the rear lamps RL and the braking deceleration according to the visibility distance.

The appropriate light intensity (Cd) calculated by the light intensity calculation and control unit 20 may be determined through regression analysis on the accumulated data and may be linearly proportional to the visibility distance information (Md) measured in real time.

The visibility distance measurement unit 10 may comprise: a video capturing module 11 that captures a video of the driving road in real time; an area recognition module 12 that identifies a driving area using the video captured by the video capturing module 11; and a visibility distance calculation module 13 that determines visibility distance information (Md) based on the driving area identified by the area recognition module 12.

The automatic light intensity control device (A) for vehicle rear lamps in response to changes in visibility distance of the present invention may further comprise a speed detection unit 30 that detects the speeds of a driving vehicle (LV) and a following vehicle (FV) in real time and transmits the detected speeds to the light intensity calculation and control unit 20, wherein the light intensity calculation and control unit 20 may determine the appropriate light intensity (Cd) by additionally reflecting information on the speeds of the driving vehicle (LV) and the following vehicle (FV) detected in real time.

If the speed ($V_f$) of the following vehicle (FV) is higher than the speed ($V_l$) of the driving vehicle (LV), the light intensity calculation and control unit 20 may determine the appropriate light intensity (Cd) by calculating a difference (s) in an appropriate braking distance between the driving vehicle (LV) and the following vehicle (FV) and correcting the visibility distance information (Md).

The rear lamp RL may be further provided with an infrared LED, and if the visibility distance information (Md) is below a reference value, an infrared control unit 40 may turn on the infrared LED of the rear lamp.

In order to achieve the above-described object, the present invention also provides an automatic light intensity control method (M) for vehicle rear lamps in response to changes in visibility distance, comprising: a visibility distance measurement step (S10) in which a visibility distance measurement unit 10 mounted on a driving vehicle or installed in the vicinity of a driving road measures a visibility distance in real time; an appropriate light intensity calculation step (S40) in which an light intensity calculation and control unit 20 mounted on the driving vehicle calculates an appropriate light intensity (Cd) using visibility distance information (Md); and a light intensity control step (S50) in which the light intensity calculation and control unit 20 controls the light intensity of rear lamps RL in real time.

The visibility distance measurement step (S10) may comprise: a step (S11) in which the visibility distance measurement unit 10 captures a video of the driving road in real time; a step (S12) in which the visibility distance measurement unit 10 identifies a driving area using the captured video; and a step (S13) in which the visibility distance measurement unit 10 determines visibility distance information (Md) based on the identified driving area.

The automatic light intensity control method (M) for vehicle rear lamps in response to changes in visibility distance of the present invention may further comprise a speed detection step (S20) in which a speed detection unit 30 detects the speeds of a driving vehicle (LV) and a following vehicle (FV) in real time and transmits the detected speeds to the light intensity calculation and control unit 20, wherein the appropriate light intensity calculation step (S40) may determine the appropriate light intensity (Cd) by additionally reflecting information on the speeds of the driving vehicle (LV) and the following vehicle (FV) detected in real time.

The automatic light intensity control method (M) for vehicle rear lamps in response to changes in visibility distance of the present invention may further comprise a braking distance calculation step (S30) in which the light intensity calculation and control unit 20 calculates a difference (s) in an appropriate braking distance between the driving vehicle (LV) and the following vehicle (FV) based on the speed ($V_l$) of the driving vehicle and the speed ($V_f$) of the following vehicle, wherein if the speed ($V_f$) of the following vehicle (FV) is higher than the speed ($V_l$) of the driving vehicle (LV), the appropriate light intensity calculation step (S40) may determine the appropriate light intensity (Cd) by calculating the difference (s) in the appropriate braking distance between the driving vehicle (LV) and the following vehicle (FV) and correcting the visibility distance information (Md).

According to the automatic light intensity control device (A) for vehicle rear lamps in response to changes in visibility distance and its control method (M) of the present invention, it is possible to automatically calculate an appropriate light intensity using visibility distance information measured in real time in the vicinity of a driving vehicle or driving road and then control the light intensity of rear lamps in real time based on the calculated light intensity.

As a result, the light intensity of the rear lamps can be continuously changed based on the real-time visibility distance of the driving vehicle, which makes it possible to ensure a more stable visibility for the following vehicle's driver.

In particular, the appropriate light intensity based on the visibility distance can be determined by utilizing accumulated data obtained by measuring the light intensity and the braking deceleration according to the visibility distance, which makes it possible to provide an actual light intensity that takes into account the driver's perception and reaction and to propose the optimal light intensity by learning the accumulated data that is continuously obtained.

Furthermore, it is possible to obtain accurate and effective visibility distance information by measuring visibility distance information directly from the driving vehicle or receiving visibility distance information measured in the vicinity of the driving road in real time.

Depending on the embodiment, the light intensity can be controlled by detecting the speeds of the driving vehicle and the following vehicle in real time or by calculating the difference in the appropriate braking distance between the driving vehicle and the following vehicle based on the detected speeds, which makes it possible to solve the accompanying problems such as unnecessarily increasing the light intensity of the rear lamps or potentially reducing the visibility for the following vehicle due to the increased light intensity.

In addition, as autonomous vehicles are expected to become increasingly prevalent in the future, the infrared LED further provided in the rear lamp can be turned on when the visibility distance information is below a reference value, which makes it possible for an infrared detection sensor provided on the following vehicle to detect it, thereby improving the autonomous driving performance even in situations where image sensing is difficult.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, preferred embodiments of the present invention will be described in detail with reference to the accompanying drawings.

An automatic light intensity control device (A) for vehicle rear lamps in response to changes in visibility distance of the present invention is proposed to allow the light intensity of rear combination lamps (hereinafter referred to as "rear lamps") installed at the rear of the vehicle to be continuously changed in response to the visibility distance of the road on which the vehicle is traveling.

Meanwhile, the rear lamps RL of the present invention are designed to be responsive to the visibility distance depending on weather conditions. The rear lamps RL include all kinds of side lights, turn signal lights, and brake lights, and the display method of the lamps is defined to encompass direct light emission, surface light emission, hologram, characters, shapes, etc.

Moreover, the methods of controlling the light intensity of the rear lamps RL include a method of increasing the luminance of individual light sources of the lamps, a method of increasing the number of illuminated light sources, and a method of combining both methods.

Figure 1:
FIG. 1 shows images of rear lamps of vehicles on a foggy road.
Figure 2:
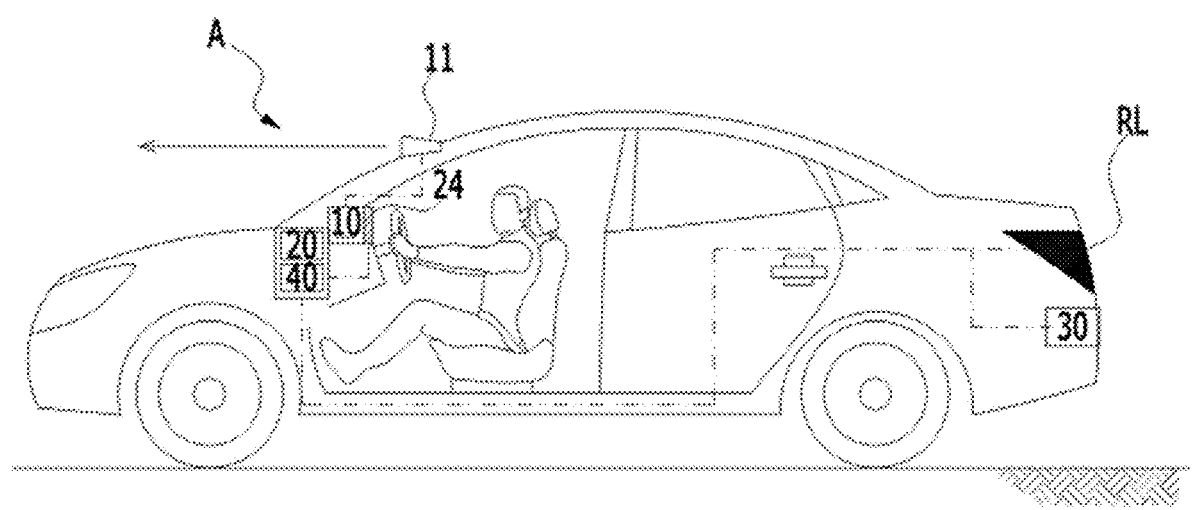
FIGS. 2 and 3 are conceptual diagrams illustrating an automatic light intensity control device for vehicle rear lamps according to various embodiments of the present invention.
Figure 3:
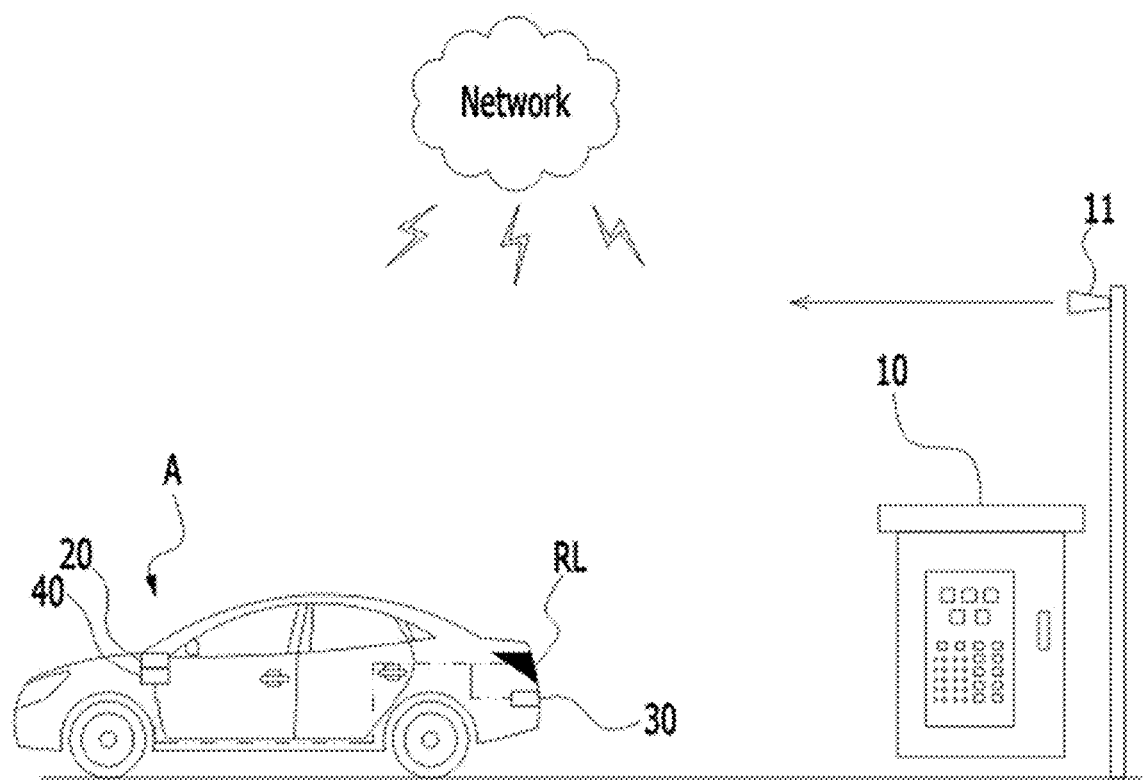

First, as shown in FIGS. 2 and 3, the automatic light intensity control device (A) for vehicle rear lamps of the present invention may comprise: a visibility distance measurement unit 10 that is mounted on a driving vehicle or installed in the vicinity of a driving road to measure the visibility distance; and a light intensity calculation and control unit 20 that is mounted on the driving vehicle to control the light intensity of rear lamps RL.

The visibility distance measurement unit 10 may be mounted on a driving vehicle and move together or may be installed in the form of a facility near a driving road to measure the visibility distance of the road in real time. Depending on the embodiment, the visibility distance measurement unit 10 may utilize infrared rays in real time or utilize video images captured in real time. Alternatively, the visibility distance measurement unit 10 may utilize visibility distance information (Md) provided by the meteorological agency. Additionally, there may be various specific methods for measuring the visibility distance by the visibility distance measurement unit 10.

The light intensity calculation and control unit 20 is mounted on a driving vehicle to receive the visibility distance information (Md) measured by the visibility distance measurement unit 10, calculate an appropriate light intensity (Cd) using the visibility distance information (Md), and then control the light intensity of the rear lamps RL in real time.

It is desirable for the light intensity calculation and control unit 20 to transmit and receive information to and from the visibility distance measurement unit 10 through a wireless communication network. However, in cases where the visibility distance measurement unit 10 is mounted on a driving vehicle, a wired communication network can also be utilized. Communication networks that interconnect these units may include internal networks, wired or wireless Internet, LTE, LoRa communication using sensor nodes, etc.

The light intensity calculation and control unit 20 can be defined as a controller unit equipped with a central processing unit, memory, and input/output buses. The term "module" used herein refers to "a block configured to change or plug in a hardware or software system". In other words, it can be defined as a single unit or block that performs a specific function in hardware or software.

Figure 4:
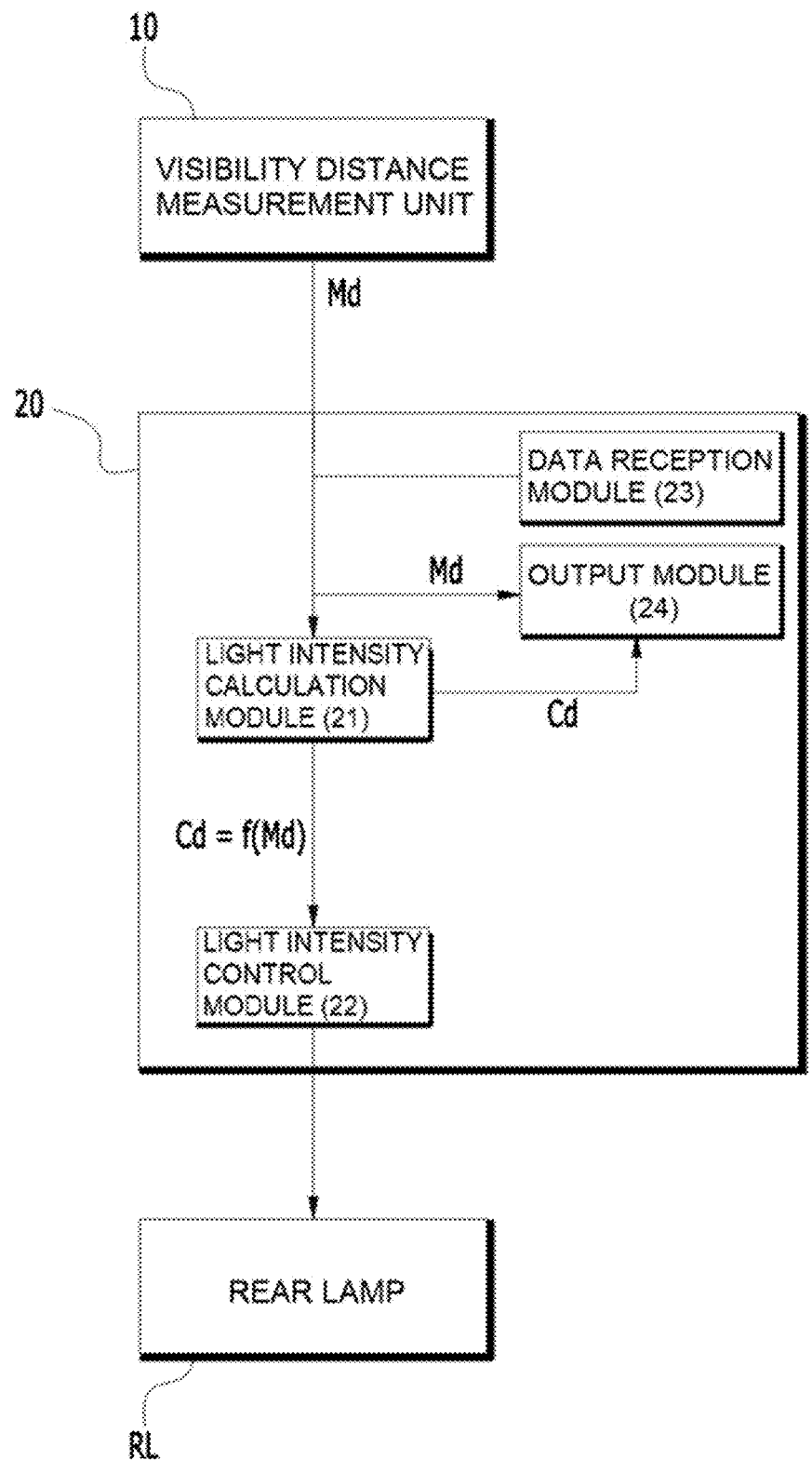
FIG. 4 is a block diagram illustrating a light intensity calculation and control unit and its algorithm according to an embodiment of the present invention.

More specifically, as shown in FIG. 4, the light intensity calculation and control unit 20 may comprise a light intensity calculation module 21 and a light intensity control module 22. Depending on the embodiment, the light intensity calculation and control unit 20 may further comprise a data reception module 23, an output module 24 and a braking distance calculation module 25 which will be described later.

The light intensity calculation module 21 of the light intensity calculation and control unit 20 calculates an appropriate light intensity (Cd) using the visibility distance information (Md) received from the visibility distance measurement unit 10, and the light intensity control module 22 controls the light intensity of the rear lamps RL in real time to display the appropriate light intensity (Cd) calculated by the light intensity calculation module 21.

Figure 5:
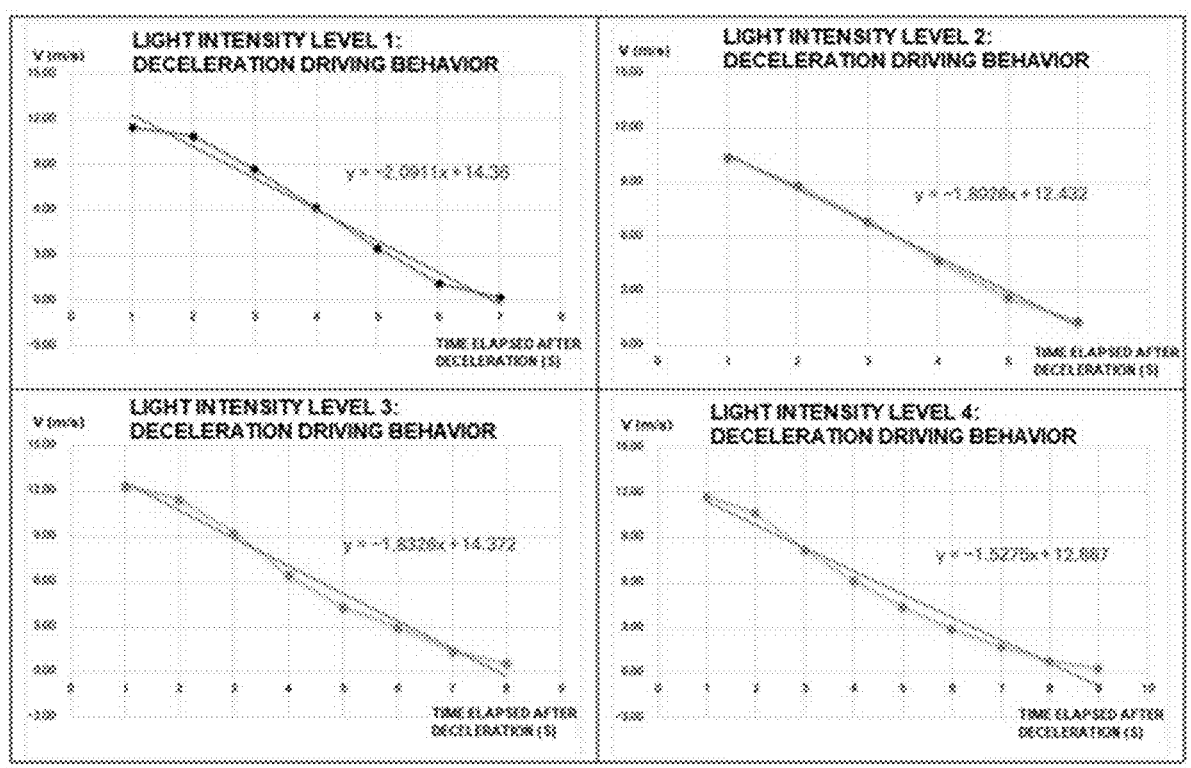
FIG. 5 shows graphs illustrating the average braking deceleration based on the light intensity of the rear lamps.

Meanwhile, the light intensity calculation module 21 may determine the appropriate light intensity (Cd) based on accumulated data obtained by measuring the light intensity of the rear lamps RL and the braking deceleration according to the visibility distance. FIG. 5 shows graphs illustrating the average braking deceleration according to the light intensity at a specific visibility distance (Md=50 m) with multiple test subjects, and Table 1 below represents an example of averaging the cumulative data for braking deceleration.

TABLE 1

| Deceleration for each light-intensity level (m/s$^2$), (Md = 50 m) | | | |
|---|---|---|---|
| 57.6 cd (level 1) | 204.8 cd (level 2) | 576.0 cd (level 3) | 1,388.8 cd (level 4) |
| 2.0911 | 1.8926 | 1.8326 | 1.5275 |

Figure 6:
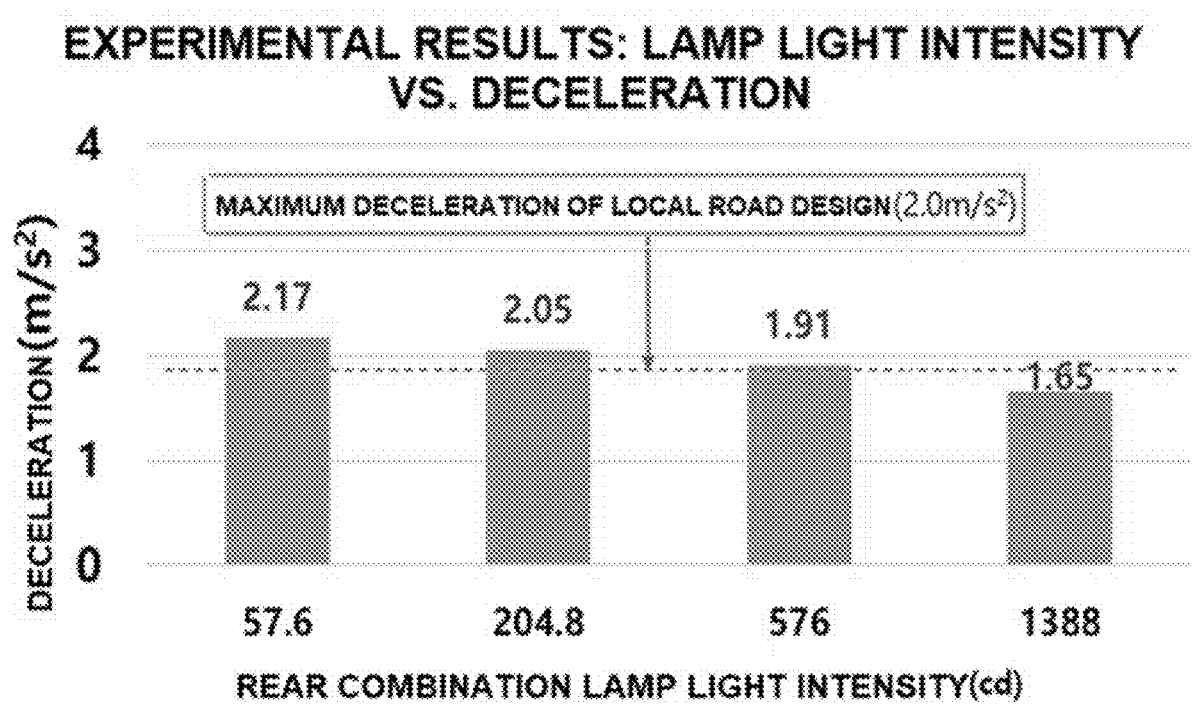
FIG. 6 shows a graph illustrating the principle of determining an appropriate light intensity that meets the standard deceleration rate according to the present invention.
Figure 7:
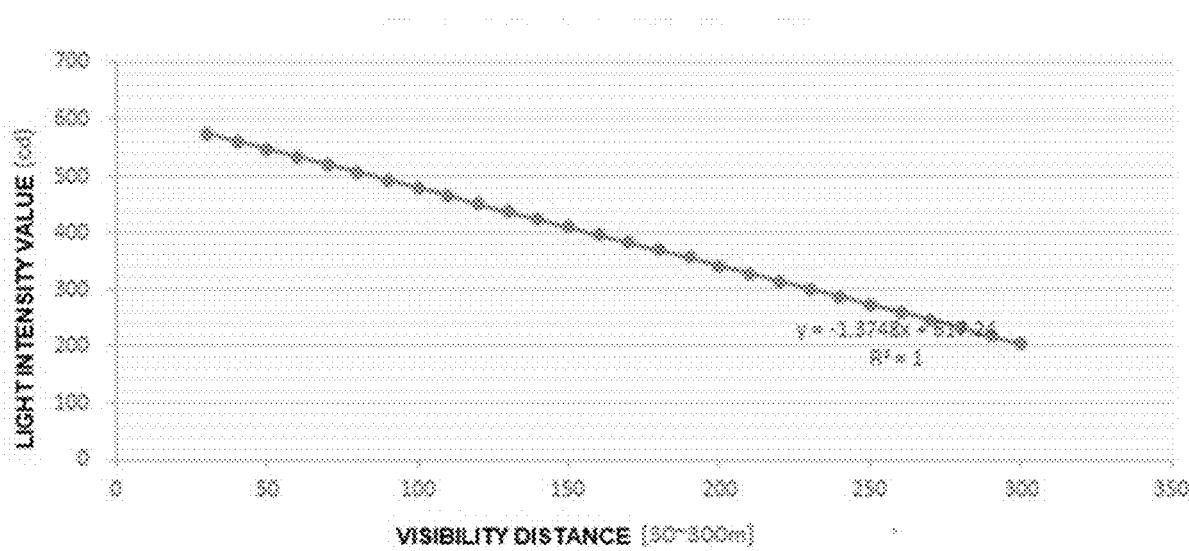
FIG. 7 shows a graph illustrating the correlation between an appropriate light intensity (Cd) and a visibility distance (Md) according to an embodiment of the present invention.

In this case, when the standard braking deceleration is defined based on the accumulated data of the average braking deceleration for each light intensity at a specific visibility distance (Md=50 m) as illustrated in FIG. 6, the minimum light intensity that satisfies this standard can be determined. In the present invention, the minimum light intensity that satisfies the relevant standard is defined as the appropriate light intensity (Cd).

As described above, using the accumulated data obtained by measuring the light intensity and the braking deceleration according to the visibility distance, it is possible to determine the correlation between the appropriate light intensity (Cd) and the visibility distance (Md). According to the accumulated data, it has been found that the appropriate light intensity (Cd) is linearly proportional to the visibility distance information (Md) measured in real time.

Meanwhile, in one embodiment where the standard braking deceleration is set to 2 m/s$^2$, according to regression analysis based on data accumulated to date, the correlation, Cd=f(Md), between the appropriate light intensity (Cd) and visibility distance (Md) has been determined as Cd=−1.3748Md+617.24.

In other words, the appropriate light intensity (Cd) calculated by the light intensity calculation and control unit 20 of the present invention can be determined based on the accumulated data obtained by measuring the light intensity of the rear lamps RL and the braking deceleration according to the visibility distance. Therefore, it is possible to provide an actual light intensity that takes into account the driver's perception and reaction. The accumulated data is updated periodically, and the light intensity calculation and control unit 20 can learn the appropriate light intensity (Cd) by itself based on the updated accumulated data.

As a result, according to the automatic light intensity control device (A) for vehicle rear lamps in response to changes in visibility distance of the present invention, the light intensity of the rear lamps can be continuously changed based on the real-time visibility distance of the driving vehicle, which makes it possible to ensure a more stable visibility for the following vehicle's driver.

Hereinafter, the visibility distance measurement unit 10 of the present invention will be described based on each embodiment. As previously described, the visibility distance measurement unit 10 may be mounted on a driving vehicle and move together or may be installed in the form of a facility near a driving road.

In one embodiment, the visibility distance measurement unit 10 may utilize infrared rays or video images captured in real time. The infrared rays are used to measure the visibility distance based on the amount of infrared rays irradiated and the amount of infrared rays detected. Hereinafter, the use of video images will be described in more detail.

Figure 8:
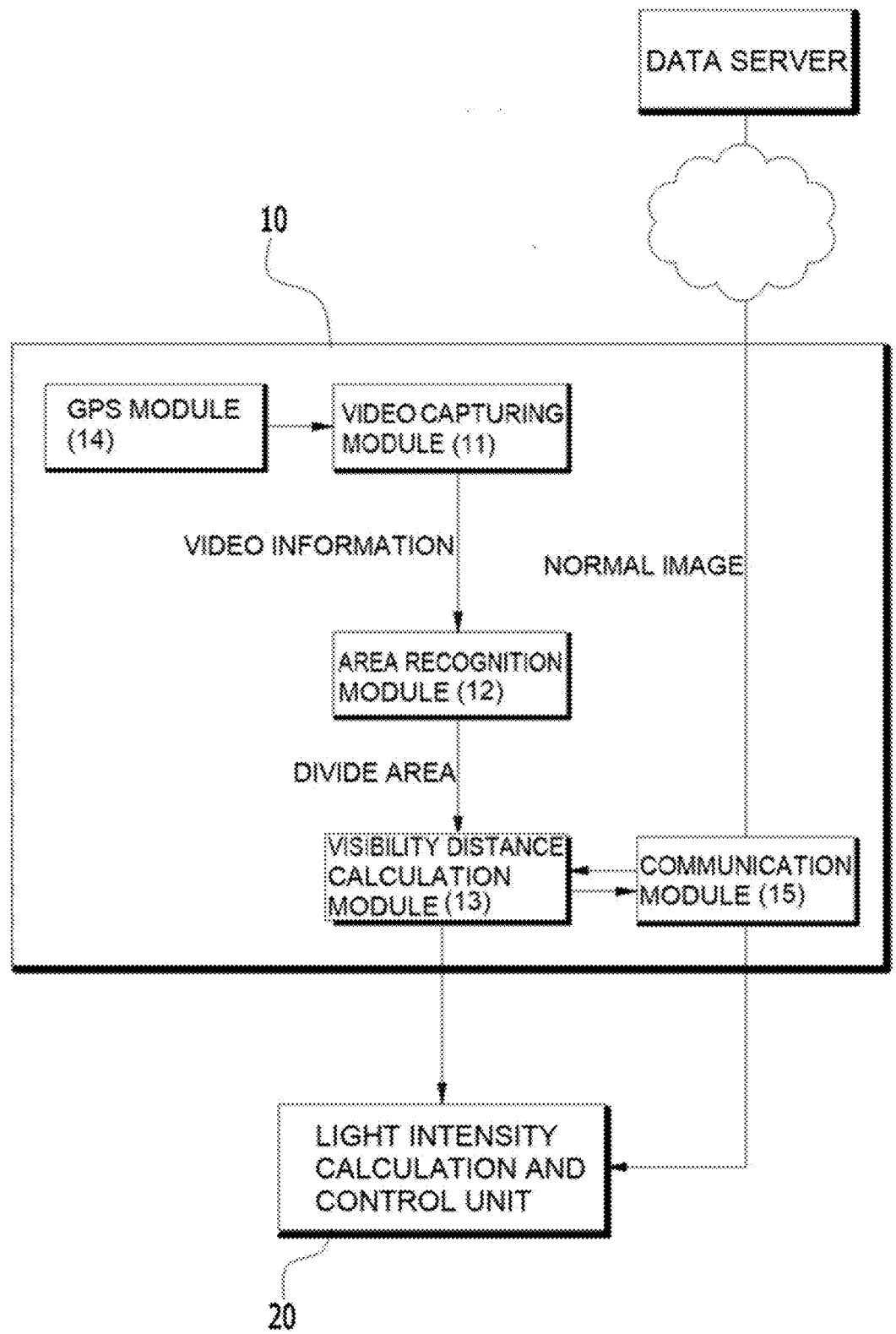
FIG. 8 is a block diagram illustrating a visibility distance measurement unit and its algorithm according to an embodiment of the present invention.
Figure 9:
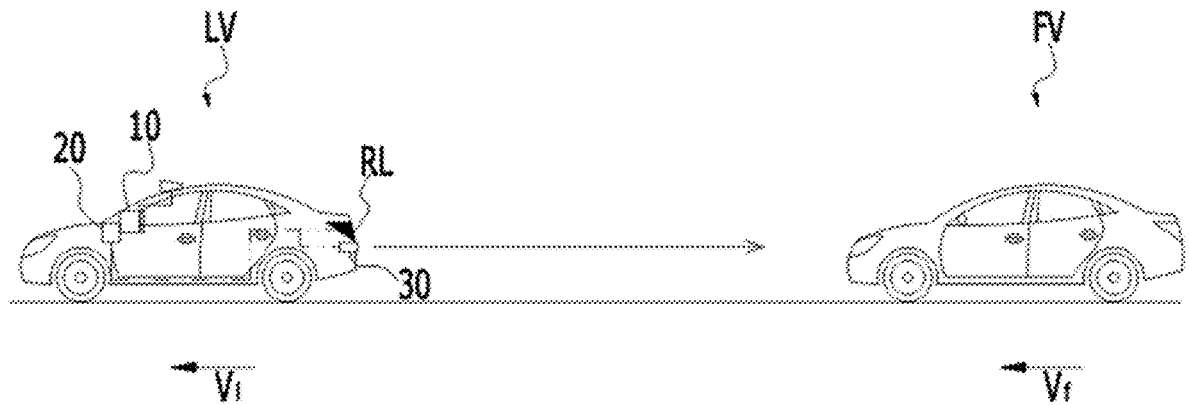
FIG. 9 is a conceptual diagram illustrating an automatic light intensity control device for vehicle rear lamps for measuring the speed of a following vehicle according to an embodiment of the present invention.

First, the visibility distance measurement unit 10 mounted on a vehicle according to an embodiment of the present invention may comprise a video capturing module 11, an area recognition module 12, and a visibility distance calculation module 13 as shown in FIGS. 2 and 8. The video capturing module 11 of the visibility distance measurement unit 10, which moves with the driving vehicle, captures a video of the driving road in real time, and the area recognition module 12 divides the frame of an image extracted from the video captured by the video capturing module 11 into area units and identifies and extracts only the driving area where the vehicle drives from the divided areas.

Subsequently, the visibility distance calculation module 13 of the visibility distance measurement unit 10 compares the driving area identified by the area recognition module 12 with an image of a normal driving area to ultimately determine the visibility distance information (Md). In this case, the image of the normal driving area is an image captured under weather conditions where the visibility distance is 300 m or more. The visibility distance measurement unit 10 of the driving vehicle is equipped with a GPS module 14 and a communication module 15 to receive the image of the normal driving area from the outside. According to this embodiment, the visibility distance information (Md) can be measured directly from the driving vehicle, which offers the advantage of obtaining accurate and effective visibility distance information.

According to another embodiment, as shown in FIG. 3, the visibility distance measurement unit 10 is located in the form of a facility near a driving road. The visibility distance measurement unit 10 may be equipped with the video capturing module 11, the area recognition module 12 and the visibility distance calculation module 13 to transmit the measured visibility distance information (Md) to the data reception module 23 of the light intensity calculation and control unit 20 mounted on the driving vehicle through the communication module 15.

Meanwhile, according to the automatic light intensity control device (A) for vehicle rear lamps in response to changes in visibility distance of the present invention, the light intensity can be controlled based further on the speed of the following vehicle (FV), thereby providing the optimal light intensity to the driver of the following vehicle (FV).

To this end, the automatic light intensity control device (A) for vehicle rear lamps of the present invention may comprise a speed detection unit 30 that detects the speeds of a leading vehicle (LV) (hereinafter referred to as the "driving vehicle") and a following vehicle (FV) in real time to transmit speed information to the light intensity calculation and control unit 20. Therefore, the light intensity calculation and control unit 20 can determine an appropriate light intensity (Cd) based further on the speed information of the driving vehicle (LV) and the following vehicle (FV) detected in real time.

More specifically, if the speed of the following vehicle (FV) is lower than that of the driving vehicle (LV), there is no need to further consider the light intensity. However, if the speed of the following vehicle (FV) is higher, the braking distance may not be sufficiently secured, even when the driver of the following vehicle (FV) recognizes the rear lamps RL of the driving vehicle (LV) and activates the braking system, and thus the present invention is intended to address this problem and make further improvements The speed detection unit 30 may comprise a relative speed detection module 32 that detects the relative speed of the following vehicle with respect to the driving vehicle, in addition to a driving speed detection module 31 which is typically provided in the vehicles. The relative speed detection module 32 may detect the relative speed between the driving vehicle and the following vehicle by measuring the distance that varies in real time by means of a distance sensor or by measuring the speed by means of a speed sensor.

The speed of the following vehicle measured by the speed detection unit 30 may be transmitted to the light intensity calculation and control unit 20 as an absolute speed, but may also be transmitted as a relative speed. Therefore, the speed of the following vehicle defined in the present invention includes a relative speed.

Figure 10:
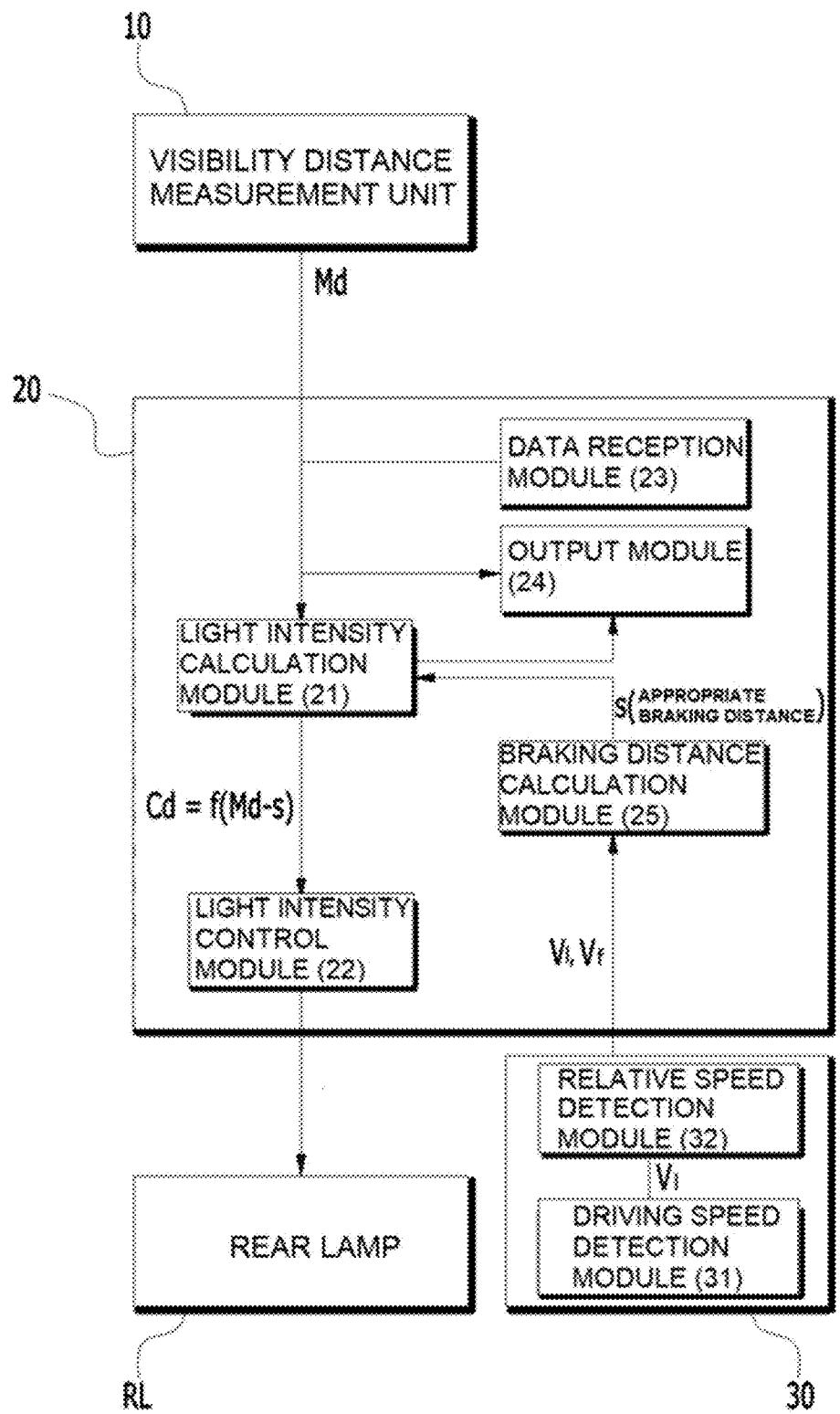
FIG. 10 is a block diagram illustrating a light intensity calculation and control unit and its algorithm that uses the speed of a following vehicle according to an embodiment of the present invention.

According to one embodiment, as shown in FIG. 10, if the speed ($V_f$) of the following vehicle (FV) is faster than the speed ($V_l$) of the driving vehicle (LV), the light intensity calculation and control unit 20 may determine the appropriate light intensity (Cd) by calculating a difference (s) in an appropriate braking distance between the driving vehicle (LV) and the following vehicle (FV) and correcting the visibility distance information (Md).

More specifically, when the light intensity calculation and control unit 20 receives the speed ($V_l$) of the driving vehicle and the speed ($V_f$) of the following vehicle from the speed detection unit 30, the braking distance calculation module 25 calculates the difference (s) in the appropriate braking distance between the driving vehicle (LV) and the following vehicle (FV) based on the speed ($V_l$) of the driving vehicle and the speed ($V_f$) of the following vehicle.

Furthermore, the light intensity calculation module 21 of the light intensity calculation and control unit 20 compares the visibility distance information (Md) with the difference (s) in the appropriate braking distance between the driving vehicle (LV) and the following vehicle (FV), and if it is greater than the visibility distance information (Md), the correlation is determined as Cd=f(Md) as described above.

On the contrary, if the visibility distance information (Md) is greater than the difference (s) in the appropriate braking distance between the driving vehicle (LV) and the following vehicle (FV), the light intensity calculation module 21 determines the appropriate light intensity (Cd) by subtracting the difference (s) in the appropriate braking distance between the driving vehicle (LV) and the following vehicle (FV) from the visibility distance information (Md) as shown in the formula below:

$$Cd = f(Md-s)$$

At this time, the difference (s) in the appropriate braking distance between the driving vehicle (LV) and the following vehicle (FV) is calculated using the formula below, where a is the standard deceleration rate of the vehicle.

$$s = \frac{(V_f^2 - V_l^2)}{2a}$$

For example, if the speed ($V_l$) of the driving vehicle is 80 km/h and the speed ($V_f$) of the following vehicle is 100 km/h, with a standard deceleration (a) of 2 m/s², the difference (s) in appropriate braking distance between the driving vehicle (LV) and the following vehicle (FV) is calculated as 61 m. Moreover, if it is applied to the correlation, Cd=−1.3748Md+617.24, between the appropriate light intensity (Cd) and visibility distance (Md) according to one embodiment, the appropriate light intensity (Cd) is determines as 564 cd.

As a result, the automatic light intensity control device (A) for vehicle rear lamps of the present invention controls the light intensity by calculating the difference (s) in the appropriate braking distance between the driving vehicle (LV) and the following vehicle (FV) based on the detected speed, which makes it possible to solve the accompanying problems such as unnecessarily increasing the light intensity of the rear lamps or potentially reducing the visibility for the following vehicle due to the increased light intensity.

Figure 11:
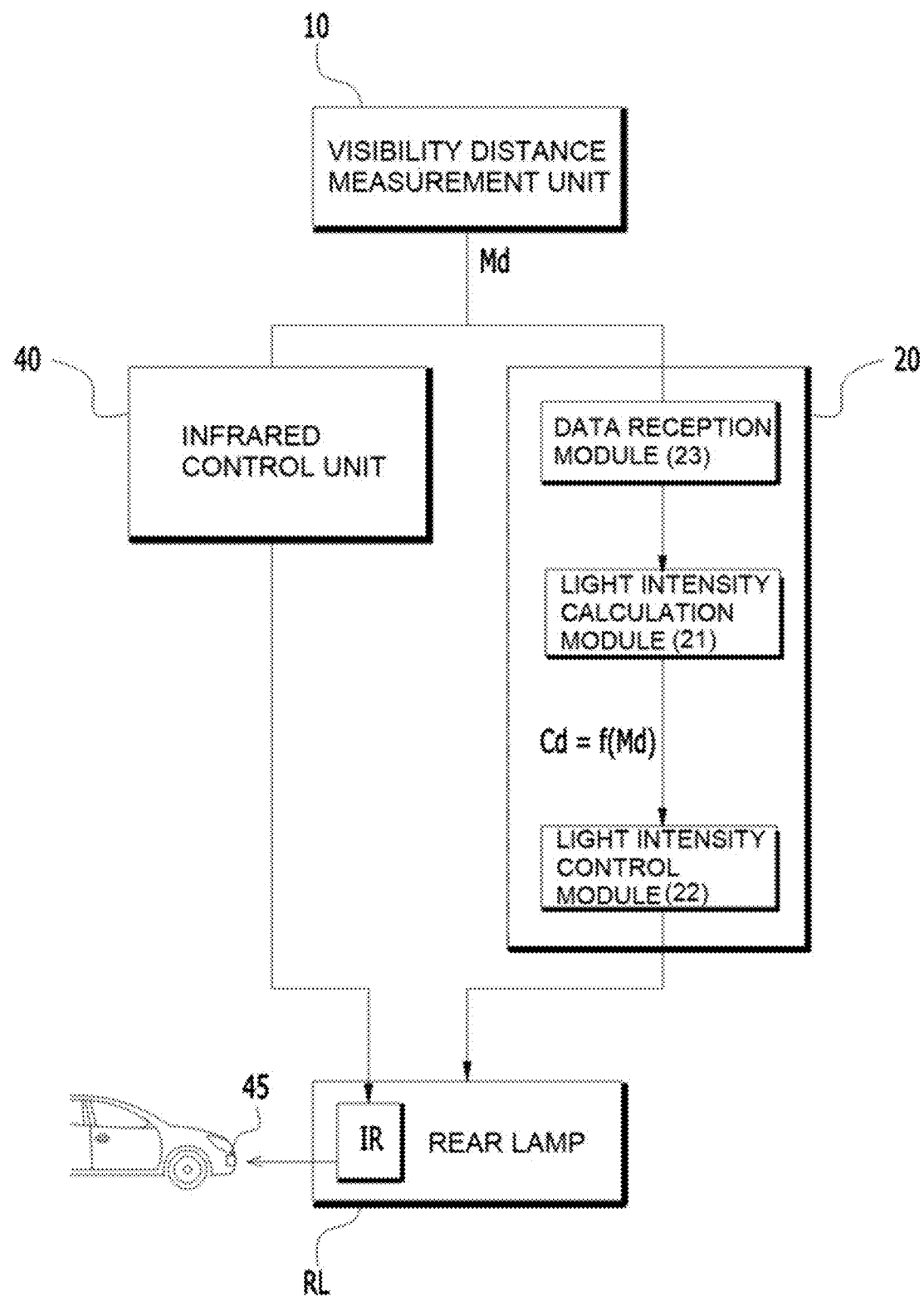
FIG. 11 is a conceptual diagram illustrating an automatic light intensity control device equipped with an infrared lamp according to an embodiment of the present invention.

As shown in FIG. 11, the rear lamp RL of the automatic light intensity control device (A) for vehicle rear lamps of the present invention may be further provided with an infrared LED. Moreover, it may comprise an infrared control unit 40 for controlling the activation and light intensity of the infrared LED provided in the rear lamp RL.

The infrared control unit 40 can activate the infrared LED provided in the rear lamp RL when the visibility distance information (Md) received from the visibility distance measurement unit 10 is below a reference value. In other words, with the advancement of autonomous driving, the future vehicle will be provided with an infrared sensor 45, which can detect infrared rays emitted from the rear lamp RL of the leading vehicle and receive distance or speed information of the leading vehicle as wavelengths in the non-visible light range.

In particular, depending on the embodiment, the infrared control unit 40 may be designed to control the amount of infrared rays of the infrared LED so that the distance or speed information of the driving vehicle can be transmitted as quantitative data.

Figure 12:
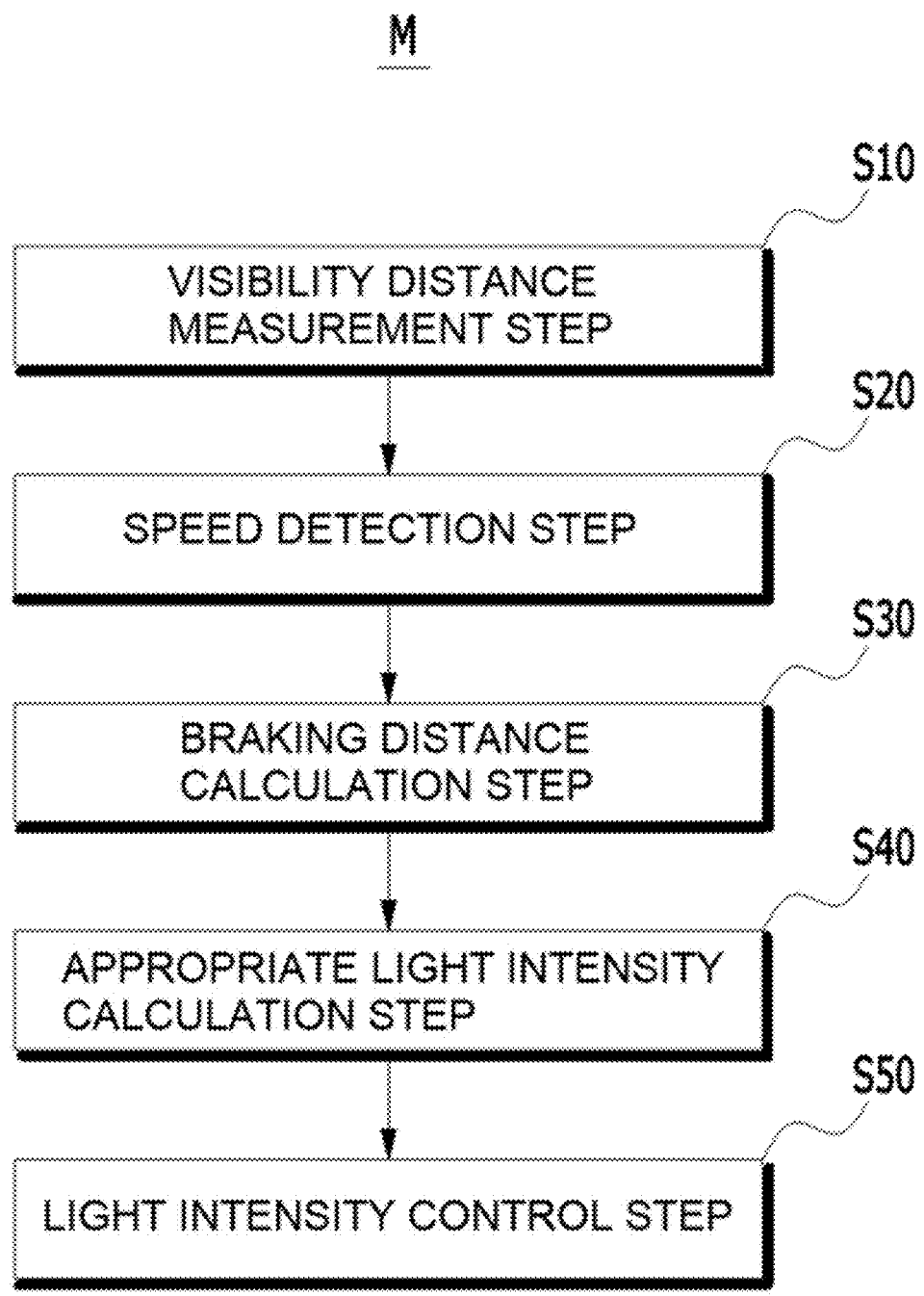
FIG. 12 is a block diagram illustrating an automatic light intensity control method for vehicle rear lamps according to an embodiment of the present invention.

Hereinafter, the automatic light intensity control method (M) for vehicle rear lamps in response to changes in visibility distance according to the present invention will be described in more detail. As shown in FIG. 12, the automatic light intensity control method (M) for vehicle rear lamps of the present invention may comprise a visibility distance measurement step (S10), an appropriate light intensity calculation step (S40), and a light intensity control step (S50).

Figure 13:
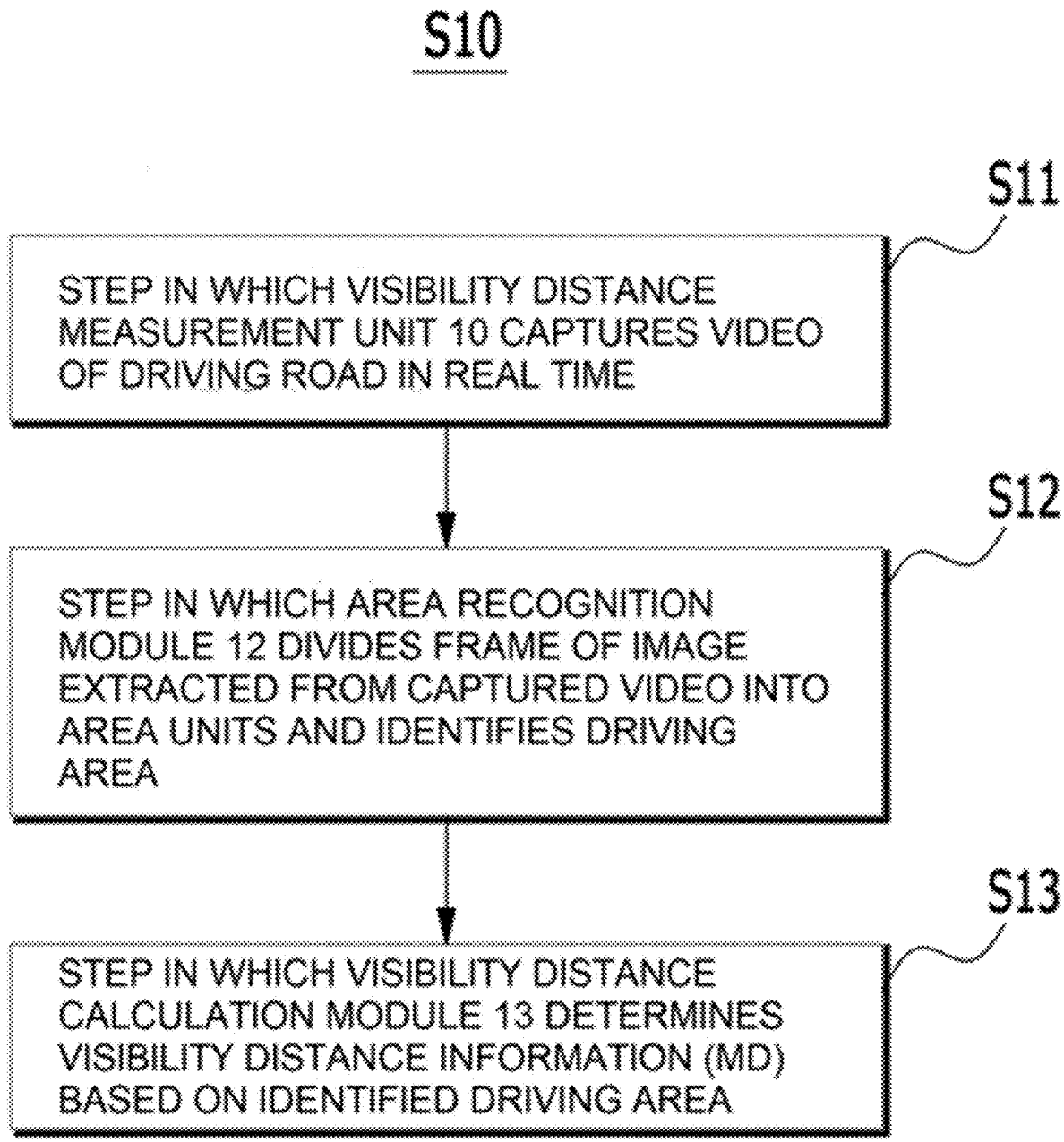
FIG. 13 is a block diagram illustrating the visibility distance measurement step according to an embodiment of the present invention.
Figure 14:
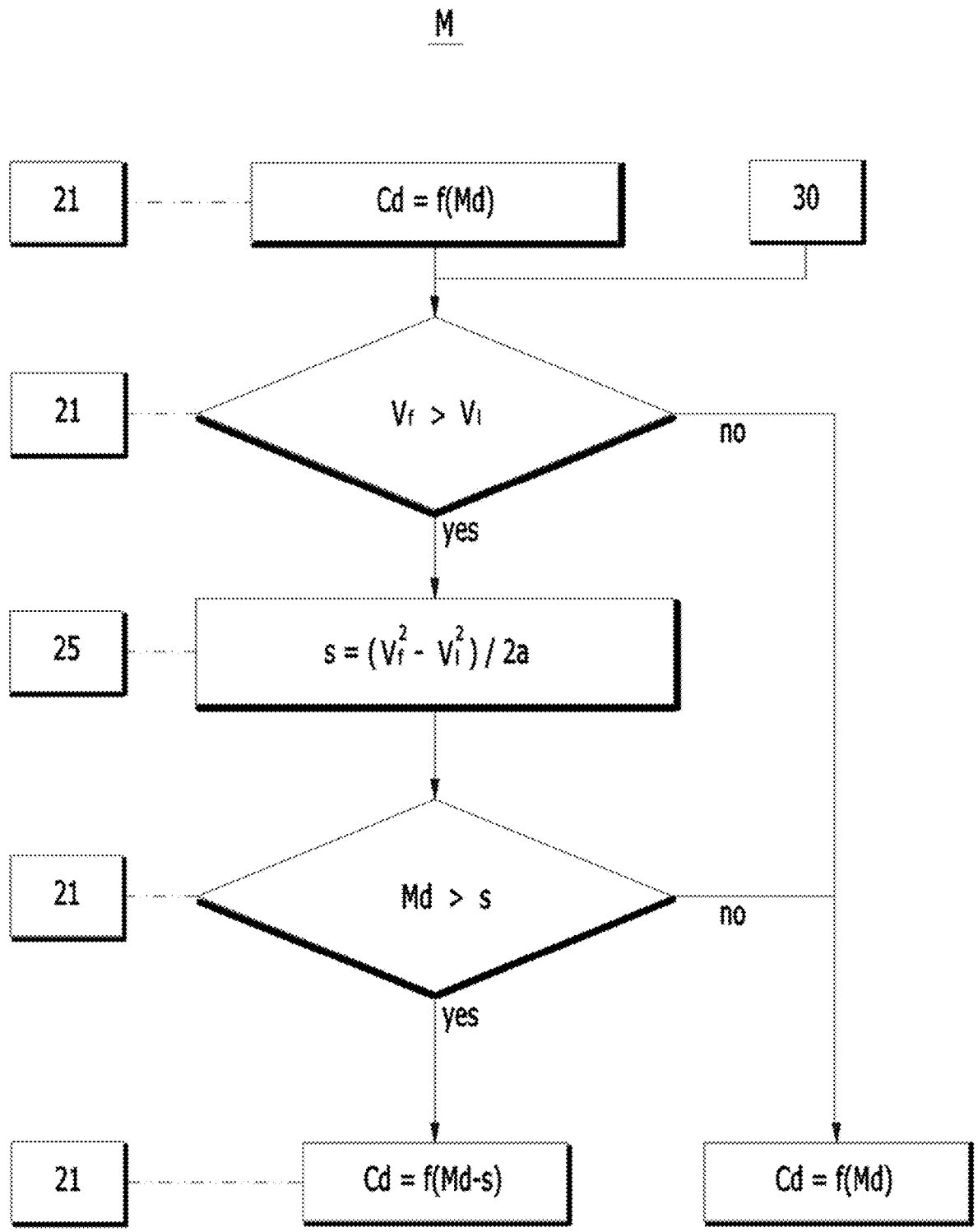
FIG. 14 is a flowchart illustrating the overall algorithm of the automatic light intensity control method (M) for vehicle rear lamps of the present invention.

First, the visibility distance measurement step (S10) is the step in which the visibility distance measurement unit 10, which is mounted on a driving vehicle or installed in the vicinity of a driving road, measures the visibility distance of the road in real time. The visibility distance measurement step (S10) may utilize various methods, but the method of utilizing video images captured in real time can proceed through the chronological steps as shown in FIG. 13.

When the video capturing module 11 of the visibility distance measurement unit 10 captures a video of the driving road in real time (S11), the area recognition module 12 of the visibility distance measurement unit 10 divides the frame of an image extracted from the captured video into area units and identifies and extracts only the driving area where the vehicle drives from the divided areas (S12). Subsequently, the visibility distance calculation module 13 of the visibility distance measurement unit 10 compares the driving area identified by the area recognition module 12 with an image of a normal driving area to ultimately determine the visibility distance information (Md) (S13). At this time, the visibility distance measurement unit 10 of the driving vehicle is equipped with a GPS module 14 and a communication module 15 to receive the image of the normal driving area from the outside and compare the driving area with the received image.

Meanwhile, the appropriate light intensity calculation step (S40) is the step in which the light intensity calculation and control unit 20 mounted on the driving vehicle calculates the appropriate light intensity (Cd) using the visibility distance information (Md). The light intensity calculation and control unit 20 of the light intensity calculation module 21 may determine the appropriate light intensity (Cd) based on accumulated data obtained by measuring the light intensity of the rear lamps RL and the braking deceleration according to the visibility distance.

Lastly, the light intensity control step (S50) is the step in which the light intensity calculation and control unit 20 controls the light intensity of the rear lamps RL in real time. The light intensity control module 22 of the light intensity calculation and control unit 20 controls the light intensity of the rear lamps RL in real time to display the appropriate light intensity (Cd) calculated by the light intensity calculation module 21.

Meanwhile, the automatic light intensity control method (M) for vehicle rear lamps of the present invention may further comprise a speed detection step (S20) in which the speed detection unit 30 detects the speeds of the driving vehicle (LV) and the following vehicle (FV) in real time and transmits the detected speeds to the light intensity calculation and control unit 20 by controlling the light intensity based further on the speed of the following vehicle (FV) to thereby provide the optimal light intensity to the driver of the following vehicle (FV).

At this time, in the speed detection step (S20), the speed detection unit 30 may comprise a relative speed detection module 32 that detects the relative speed of the following vehicle with respect to the driving vehicle, in addition to the driving speed detection module 31.

Subsequently, the appropriate light intensity calculation step (S40) determines the appropriate light intensity (Cd) by additionally reflecting information on the speeds of the driving vehicle (LV) and the following vehicle (FV) detected in real time, thus preventing the occurrence of a collision when the driver of a faster following vehicle (FV) recognizes the rear lamps RL of the driving vehicle (LV) belatedly.

According to one embodiment, the automatic light intensity control method (M) for vehicle rear lamps of the present invention may further comprise a braking distance calculation step (S30) in which the braking distance calculation module 25 of the light intensity calculation and control unit 20 calculates a difference (s) in an appropriate braking distance between the driving vehicle (LV) and the following vehicle (FV)) based on the speed ($V_l$) of the driving vehicle and the speed ($V_f$) of the following vehicle.

Subsequently, if the speed ($V_f$) of the following vehicle (FV) is faster than the speed ($V_l$) of the driving vehicle (LV), the appropriate light intensity calculation step (S40) may determine the appropriate light intensity (Cd) by calculating the difference (s) in an appropriate braking distance between the driving vehicle (LV) and the following vehicle (FV) and correcting the visibility distance information (Md).

Furthermore, depending on the embodiment, the rear lamp RL may be further provided with an infrared LED, and in the light intensity control step (S50), if the visibility distance information (Md) is below a reference value, the infrared control unit 40 may control the infrared LED of the rear lamp to be turned on. In this case, the infrared control unit 40 may be designed to control the amount of infrared rays of the infrared LED so that the distance or speed information of the driving vehicle can be transmitted as quantitative data.

It will be appreciated by those skilled in the art to which the present invention pertains that the automatic light intensity control device (A) for vehicle rear lamps in response to changes in visibility distance and its control method (M) according to the present invention as described above can be implemented in other specific forms without changing the technical spirit or essential features of the present invention.

Therefore, the embodiments described above should be understood as illustrative in all aspects, instead of limiting. The scope of the present disclosure is defined not by the detailed description, but by the appended claims and their equivalents, and the meaning and scope of the claims and all changes or modifications derived from their equivalents should be construed as being included in the scope of the present disclosure.

---

Brief Description of Reference Numerals

A: automatic light intensity control device for vehicle rear lamps
RL: lear lamp
10: visibility distance measurement unit
20: light intensity calculation and control unit 20
30: speed detection unit
40: infrared control unit
LV: driving vehicle
FV: following vehicle
M): automatic light intensity control method for vehicle rear lamps
S10: visibility distance measurement step
S20: speed detection step
S30: braking distance calculation step
S40: appropriate light intensity calculation step
S50: light intensity control step

---

What is claimed is:

1. An automatic light intensity control device for vehicle rear lamps in response to changes in visibility distance, the automatic light intensity control device comprising:
   a visibility distance measurement unit 10 that is mounted on a driving vehicle and configured to measure a visibility distance of a driving road in real time; and
   a light intensity calculation and control unit 20 that is mounted on the driving vehicle, and configured to calculate an appropriate light intensity (Cd) using visibility distance information (Md) measured by the visibility distance measurement unit 10 and then control the light intensity of rear lamps RL in real time, and determine the appropriate light intensity (Cd) using real-time visibility distance information (Md) based on accumulated data accounting the driver's perception and reaction, obtained by measuring the light intensity of the rear lamps RL and a braking deceleration according to the visibility distance; and
   a speed detection unit 30 configured to detect the speeds of a driving vehicle (LV) and a following vehicle (FV) in real time, and transmit the detected speeds to the light intensity calculation and control unit 20, wherein the appropriate light intensity (Cd) calculated by the light intensity calculation and control unit 20 is determined through regression analysis on the accumulated data, and the appropriate light intensity (Cd) is determined as a minimum light intensity that satisfies a standard braking deceleration, wherein when the speed ($V_f$) of the following vehicle (FV) is higher than the speed ($V_l$) of the driving vehicle (LV), the light intensity calculation and control unit 20 determines the appropriate light intensity (Cd) by calculating a difference(s) in an appropriate braking distance between the driving vehicle (LV) and the following vehicle (FV) and correcting the visibility distance information (Md), and wherein the rear lamps RL are further provided with an infrared LED, and if the visibility distance information (Md) is below a reference value, an infrared control unit turns on the infrared LED of the rear lamps RL.

2. The automatic light intensity control device for vehicle rear lamps in response to changes in visibility distance of claim 1, wherein the visibility distance measurement unit 10 comprises:
- a video capturing module 11 that captures a video of the driving road in real time;
- an area recognition module 12 that identifies a driving area using the video captured by the video capturing module 11; and
- a visibility distance calculation module 13 that determines visibility distance information (Md) based on the driving area identified by the area recognition module 12.

3. An automatic light intensity control method for vehicle rear lamps in response to changes in visibility distance, the automatic light intensity control method comprising:
- a visibility distance measurement step (S10) in which a visibility distance measurement unit 10 mounted on a driving vehicle measures a visibility distance of a driving road in real time;
- a speed detection step (S20) in which a speed detection unit 30 detects the speeds of a driving vehicle (LV) and a following vehicle (FV) in real time and transmits the detected speeds to a light intensity calculation and control unit 20;
- a braking distance calculation step (S30) in which the light intensity calculation and control unit 20 calculates a difference(s) in an appropriate braking distance between the driving vehicle (LV) and the following vehicle (FV) based on the speed ($V_l$) of the driving vehicle and the speed ($V_f$) of the following vehicle;
- an appropriate light intensity calculation step (S40) in which an light intensity calculation and control unit 20 mounted on the driving vehicle calculates an appropriate light intensity (Cd) using visibility distance information (Md); and
- a light intensity control step (S50) in which the light intensity calculation and control unit 20 controls the light intensity of rear lamps RL in real time, wherein the appropriate light intensity (Cd) calculated by the light intensity calculation and control unit 20 is determined through regression analysis on accumulated data accounting the driver's perception and reaction, obtained by measuring the light intensity of the rear lamps RL and a braking deceleration according to the visibility distance, and the appropriate light intensity (Cd) is determined as a minimum light intensity that satisfies a standard braking deceleration, wherein when the speed ($V_f$) of the following vehicle (FV) is higher than the speed ($V_l$) of the driving vehicle (LV), the appropriate light intensity calculation step (S40) determines the appropriate light intensity (Cd) by calculating the difference(s) in the appropriate braking distance between the driving vehicle (LV) and the following vehicle (FV) and correcting the visibility distance information (Md), and wherein the rear lamps RL is further provided with an infrared LED, and if the visibility distance information (Md) is below a reference value, an infrared control unit turns on the infrared LED of the rear lamps RL.

4. The automatic light intensity control method for vehicle rear lamps in response to changes in visibility distance of claim 3, wherein the visibility distance measurement step (S10) may comprise:
- a step (S11) in which the visibility distance measurement unit 10 captures a video of the driving road in real time;
- a step (S12) in which the visibility distance measurement unit 10 identifies a driving area using the captured video; and
- a step (S13) in which the visibility distance measurement unit 10 determines visibility distance information (Md) based on the identified driving area.

\* \* \* \* \*